(12) United States Patent
Kirjavainen et al.

(10) Patent No.: US 6,416,211 B1
(45) Date of Patent: Jul. 9, 2002

(54) METHOD AND APPARATUS FOR MOLDING PLASTIC

(75) Inventors: Kari Kirjavainen, Espoo; Jyri Järvenkylä, Hollola, both of (FI)

(73) Assignee: Conenor Oy, Espoo (FI)

( * ) Notice: Subject to any disclaimer, the term of this patent is extended or adjusted under 35 U.S.C. 154(b) by 0 days.

(21) Appl. No.: 09/125,321

(22) PCT Filed: Feb. 20, 1997

(86) PCT No.: PCT/FI97/00110

§ 371 (c)(1),
(2), (4) Date: Jan. 19, 1999

(87) PCT Pub. No.: WO97/30833

PCT Pub. Date: Aug. 28, 1997

(30) Foreign Application Priority Data

Feb. 20, 1996 (FI) .................................................. 960768

(51) Int. Cl.⁷ ................................................. B29B 7/00
(52) U.S. Cl. ......................... 366/93; 366/92; 425/585; 425/586; 264/328.17; 428/411.1; 428/463
(58) Field of Search .............................. 366/69, 92, 93; 425/585, 586; 269/328.17; 428/411.1, 162, 163

(56) References Cited

U.S. PATENT DOCUMENTS

| | | | |
|---|---|---|---|
| 3,388,425 A | 6/1968 | Detter | 18/13 |
| 3,425,455 A | 2/1969 | Kilpert et al. | 138/146 |
| 4,501,781 A | * 2/1985 | Kushida et al. | 428/35 |
| 4,519,976 A | 5/1985 | Uhlig | 264/540 |
| 4,640,313 A | 2/1987 | Stanley | 138/141 |
| 5,176,180 A | * 1/1993 | Williams et al. | 138/172 |
| 5,228,186 A | 7/1993 | Brettell et al. | 29/611 |
| 5,387,386 A | 2/1995 | Kirjavainen | 264/171.29 |

FOREIGN PATENT DOCUMENTS

| | | |
|---|---|---|
| CA | 2127746 | 1/1995 |
| EP | 0317237 | 5/1989 |
| EP | 0353977 | 2/1990 |
| EP | 0530507 | 3/1993 |
| EP | 0563721 | 10/1993 |
| EP | 0571181 | 11/1993 |
| EP | 0581566 | 2/1994 |
| EP | 0619172 | 10/1994 |
| GB | 848423 | 9/1960 |
| GB | 2202783 | 10/1988 |
| GB | 2245977 | 1/1992 |
| WO | 8401920 | 5/1984 |
| WO | 8503027 | 7/1985 |
| WO | 8911961 | 12/1989 |
| WO | 9002644 | 3/1990 |
| WO | 9319923 | 10/1993 |
| WO | 970142 | 1/1997 |

OTHER PUBLICATIONS

Patent Abstracts of Japan, vol. 7, No. 105, p. 195 of JP 5827040 dated Feb. 17, 1983.

\* cited by examiner

*Primary Examiner*—Blaine Copenheaver
*Assistant Examiner*—Christopher Paulraj
(74) *Attorney, Agent, or Firm*—Ladas & Parry

(57) ABSTRACT

An apparatus for molding plastic including: (a) an injection space; (b) forming apparatus for supplying plastic material to the injection space, the forming apparatus having at least an inner conical stator and an outer conical stator and at least one rotatable rotor disposed outside of the inner conical stator; and (c) a piston for compressing the plastic material supplied to the injection space into a mold to form the plastic material into a shape determined by the mold.

24 Claims, 3 Drawing Sheets

METHOD AND APPARATUS FOR MOLDING PLASTIC

FIELD OF THE INVENTION

The invention relates to a method for molding plastic, in which method plastic material is supplied to an injection space with injection means comprising at least one conical stator and at least one conical rotor, the rotor being rotated in such a way that as the rotor rotates, it supplies plastic material to be molded, so that the plastic material passes through the injection space and is compressed into a shape determined by a mold.

The invention also relates to an apparatus for molding plastic, the apparatus comprising an injection space, at least one conical stator and at least one conical rotatable rotor, the stator and the rotor forming means for supplying plastic material via the injection space, and means for compressing the plastic material into a shape determined by a mold.

The invention further relates to a plastic product produced with the method according to the invention.

BACKGROUND OF THE INVENTION

DE 3,814,571 discloses a piston engine injection press. This injection press comprises a plasticizing screw in which the material to be molded is plasticized and with which it is supplied to a container via a valve. The container comprises an associated piston which can be moved with an actuator, so that when the container contains a sufficient amount of the material to be molded, the material is molded by means of the piston. The apparatus is cumbersome due to its deconcentrated structure. It is also difficult to adjust the apparatus, which is therefore not suitable for producing complicated technical products. The mass to be injected is also rather non-homogenous.

WO 85/03027 discloses an injection press wherein a screw is placed inside a cylindrical body. The material to be melted is supplied with a feed worm to a feed hopper and with the feed hopper to the space between the screw and the cylindrical body. The screw can be rotated, whereupon the screw thread transports the material to be melted forward and extracts new raw material from the hopper. Further, heating resistors are positioned around the body, so that when the screw transports the material forward, the raw material melts by the action of the heating resistors and the heat resulting from friction. At the same time as the screw rotates it also moves backwards, whereupon molten mass fills the space in front of the screw head. When a sufficient amount of material has been transported to the front of the screw, the rotation of the screw is terminated and the screw is pushed forward, whereupon the molten raw material flows via an injection aperture into the mold. This equipment is rather large and therefore expensive due to the length of the screw. Further, the batches of material injected at a time are rather small. Also, the orientation in the material of the product to be injected cannot be determined in any way.

WO 93/19923 discloses an injection press comprising a cylindrical body with a cylindrical screw movable axially and rotatably in it. The material to be supplied is fed with a feed hopper into the exterior of the screw. The screw, and partly the body, comprises threads with which the material to be supplied can be moved towards the front of the injection press. The interior of the screw comprises a core enabling the adjustment of the volume of the container to which the material to be injected is conducted. When the container contains a sufficient amount of the material to be injected, the material is pushed through a nozzle into the mold by means of the screw or a combination of the screw and the core. The apparatus is complicated and therefore difficult and expensive to manufacture. Further, the length of the screw and the core increases the manufacturing costs of the apparatus. Also, the orientation of the material of the product to be molded cannot be controlled in any way with this apparatus.

U.S. Pat. No. 4,519,976 and EP 0,619,172 disclose an injection press comprising a conical rotor outside which there is a conical stator, so that when the rotor rotates, it supplies material to be molded to the injection space. The conical structure does provide the injection press with a short and simple construction, but in the injection-molding apparatus according to the aforementioned references it is very difficult to arrange the heating and/or cooling functions of the material to take place from the inside of the cone formed by the supply means, i.e. through the rotating rotor. Also, it is difficult to provide high molding pressures in the feed opening between the rotor and the stator described in the references. Further, it is not possible to manufacture oriented products with the structure according to the EP reference, and the arrangement according to the U.S. reference requires the use of complicated and cumbersome mold tools.

The purpose of the present invention is to provide a method and an apparatus that do not comprise the aforementioned drawbacks. A further purpose of the invention is to provide a fiber-oriented plastic product produced with a mold.

The method according to the invention is characterized in that the rotor is placed outside at least one stator.

SUMMARY OF THE INVENTION

Further, the apparatus according to the invention is characterized in that at least one rotor is placed on the outside of at least one stator.

Further, the plastic product prepared with the method according to the invention is characterized in that the material of the plastic product is substantially oriented.

The essential idea of the invention is that the means for supplying material to the injection space include a conical rotor and a conical stator that are placed in such a way that the rotatable rotor is positioned outside the stator. The idea of an embodiment is that there is also another stator provided outside the rotatable rotor, so that the material to be molded flows both inside and outside the rotor. The idea of a preferred embodiment is that a piston with which the material supplied to the injection space is ejected into the mold is positioned in the centre of the apparatus. The idea of another preferred embodiment is that a mandrel is placed inside the piston, whereupon the material to be fed from between the rotor and the stators is supplied to a substantially tubular space between the mandrel and the frame, and outside the mandrel there is a cylindrical piston with which the material to be pressed is molded. The idea of a third preferred embodiment is that in the middle of the means for supplying the material there are blow means for compressing the material by means of compressed air into the shape determined by the mold.

The invention has the advantage that, when the material is supplied with conical stators and a rotor, the injection press can be provided with a short and simple structure. When the rotor is placed outside the stator, the means for controlling the temperature of the material to be molded can be placed easily in the middle of the injection press to warm the material to be molded from the inner stator. Also, it is easy to place the supply means for supplying the material to be molded in the inner stator, so that the injection press will have a simple and compact structure. When another stator is provided outside the rotor, the material to be molded can be made to flow both inside and outside the rotor, so that the rotor in a way floats inside the mass to be molded, and high molding pressures can be generated advantageously. Further, by positioning the mandrel inside the piston the orientation of the material to be fed, oriented by means of the stators and the rotors, can be maintained when the material is inserted into the substantially tubular space between the mandrel and the frame. Further, the orientation can be maintained by molding the product with a substantially tubular piston, thus producing fiber-oriented injection-molded products.

BRIEF DESCRIPTION OF THE DRAWINGS

The invention will be described in greater detail in the accompanying drawings, in which.

DETAILED DESCRIPTION

Figure 1:
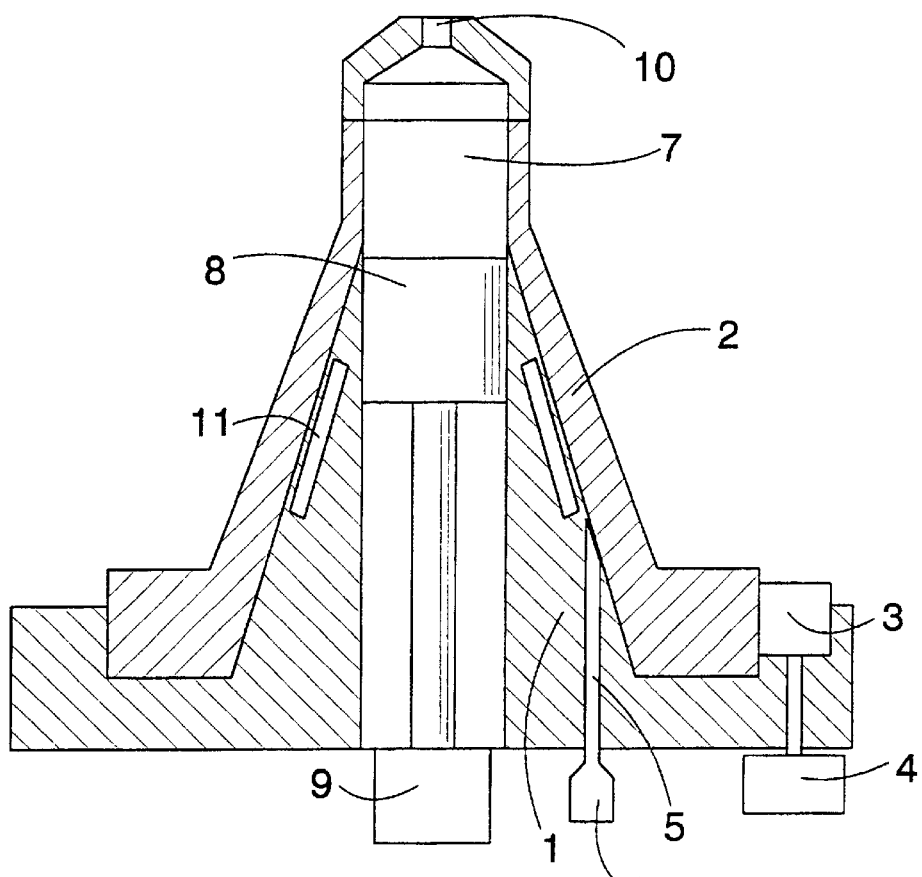
FIG. 1 is a schematic side view of the cross-section of an apparatus according to the invention.

FIG. 1 shows an apparatus consisting of a conical stator and a conical rotor 2 provided rotatably outside the stator. The rotor 2 is rotated with a motor 4. The speed of rotation of the cone can be adjusted with a gear system 3. The speed of rotation of the rotor 2 can also be adjusted without the gear system 3, for example by using an electric motor with an adjustable rotational frequency as the motor 4. Further, it is not necessary to adjust the rotational frequency of the rotor 2, but it can be set to a suitable level. The motor 4 may also be for example a hydraulic motor or some other known apparatus suitable for the purpose. The material to be injected is supplied via a supply conduit 5 to the space between the rotor 2 and the stator 1. The material to be supplied is fed into the supply conduit 5 with a feeder 6. The supply conduit 5 can be easily positioned through the stationary stator 1, so that the structure of the apparatus is simple and compact.

The surfaces of the rotor 2 and/or the stator 1 positioned against one another comprise screw threads, which are not shown in the accompanying figure for the sake of clarity. By means of these screw threads the rotor 2 supplies, as it rotates, material to be injected to an injection space 7. The injection space 7 is cylindrical. When the injection space 7 contains a sufficient amount of the material to be injected, a cylindrical piston 8 placed in the middle of the injection press ejects the material through a nozzle 10. The piston 8 is operated with an actuator, such as a hydraulic motor 9, shown schematically in FIG. 1. Instead of the hydraulic motor 9, the actuator may also be for example a spindle motor or some other construction known per se. A mold to which the material to be injected is directed is placed in association with the nozzle 10. This mold is not shown in the accompanying figure for the sake of clarity.

It is very easy and simple to provide the stator 1 with means 11 for controlling the temperature of the material to be injected, the means being used to effectively heat and/or cool the material to be injected from the inside.

Figure 2:
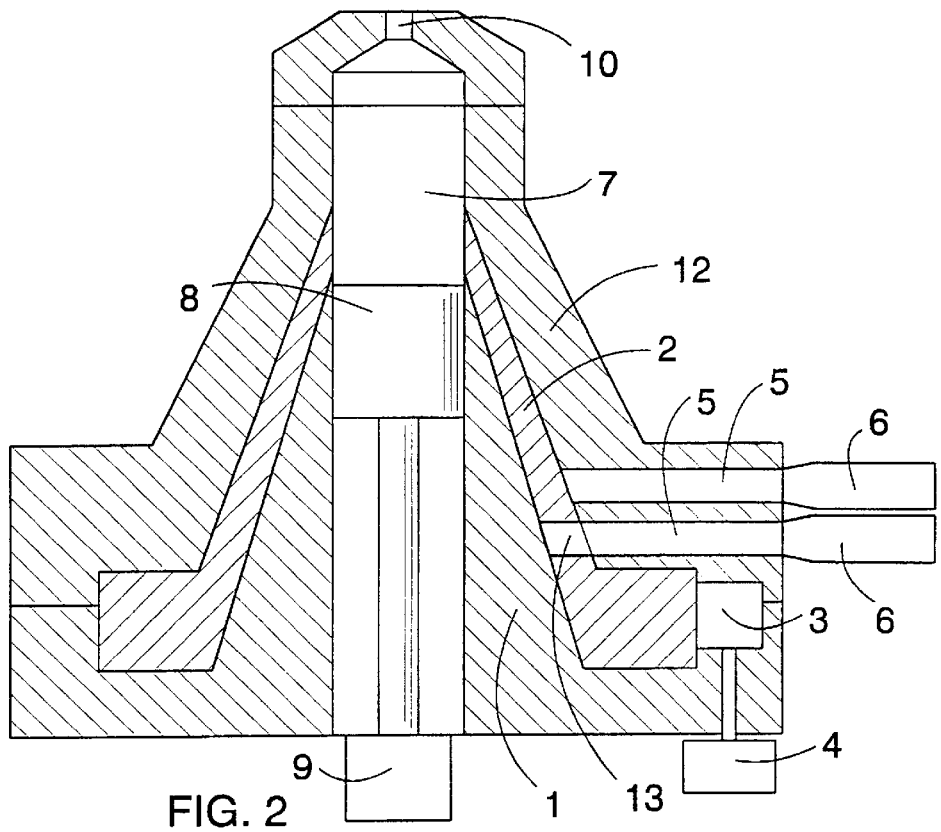
FIG. 2 is a schematic side view of the cross-section of a second apparatus according to the invention.

FIG. 2 shows another apparatus according to the invention. The reference numerals in FIG. 2 correspond to those in FIG. 1. Outside the rotor 2 there is a conical outer stator 12. The material to be injected is then supplied to the injection space 7 both inside and outside the rotor 2. The rotor 2 thus floats in the material to be molded, so that it is possible to generate high molding pressures in a rather simple manner.

The material to be injected is supplied via supply conduits 5 to the interior and the exterior of the rotor 2. Via the first supply conduit 5, the material to be injected can be supplied to the space between the rotor 2 and the outer stator 12. The material to be supplied is fed into the first supply conduit with a first feeder 6, which may be for example a feed worm, a pump or some other feeder known per se. Via the second supply conduit 5, the material to be molded is supplied to the space between the rotor 2 and the inner stator 1 through openings 13 provided in the rotor. The material to be molded is fed into the second supply conduit 5 with a second feeder 6 corresponding to the first feeder 6. Only one supply conduit is also possible, whereupon the material to be molded can be fed along the single supply conduit both into the interior and the exterior of the rotor 2 in a manner known per se.

The interior and the exterior of the rotor 2 comprise screw threads, which are not shown in the accompanying figure for the sake of clarity. By means of the screw threads the rotor 2 supplies, during its rotation, the material to be injected to an injection space 7. The injection space 7 is cylindrical and bordered by the inner surface of the outer stator 12. When the injection space 7 contains a sufficient amount of the material to be injected, a cylindrical piston 8 placed in the middle of the injection press ejects the material through a nozzle 10. A mold to which the material to be injected is directed is placed in association with the nozzle 10. This mold is not shown in the accompanying FIG. 2 for the sake of clarity.

Figure 3:
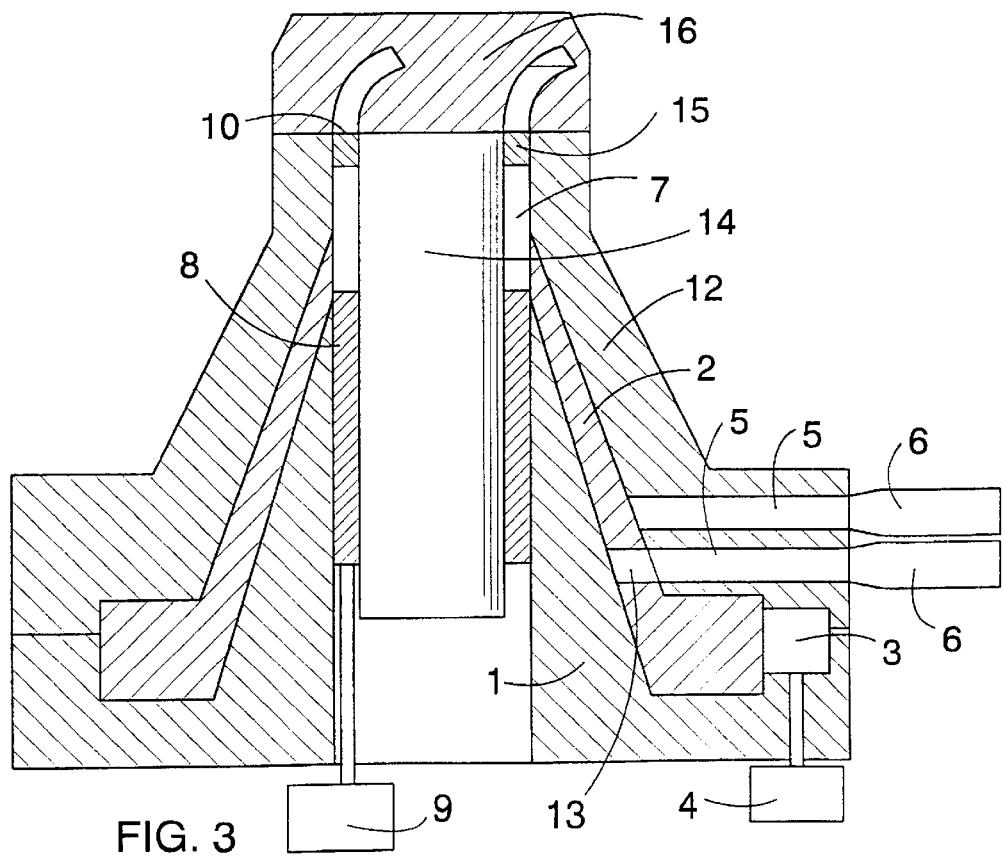
FIG. 3 is a schematic side view of the cross-section of a third apparatus according to the invention.

FIG. 3 shows a third apparatus according to the invention. The reference numerals in FIG. 3 correspond to those in FIGS. 1 and 2. The piston 8 is hollow, whereupon a cylindrical mandrel 14 is placed inside it so that the injection space 7 is formed by a substantially tubular space bordered by the mandrel 14 and the outer stator 12. The definition 'substantially tubular' covers in connection with the present application for example such alternatives that the injection space 7 has an elliptic or asymmetrical cross-section or that the size or shape of its cross-section varies. The injection space 7 is designed in such a way that the material supplied by the stators 1 and 12 and the rotor 2 flows into the injection space 7 maintaining the helical orientation provided by the stators 1 and 12 and the rotor 2. A closing means 15, which prevents the material to be injected from flowing into the mold too early, is placed at the end of the injection space. When the injection occurs, the closing means 15 is opened so that when the hollow cylindrical piston 8 moves, the material to be molded can be pressed from the injection space 7 into the mold 16. The nozzle 10 of the apparatus is annular so that the orientation of the material to be molded can also be maintained inside the mold 16. There are no weld lines in the product provided with the mold 16, either. For the sake of clarity, the mold 16 is only shown schematically and its shape may be selected freely. The accompanying FIG. 3 shows schematically a mold 16 which provides for example elbow pieces for pipes.

Figure 4:
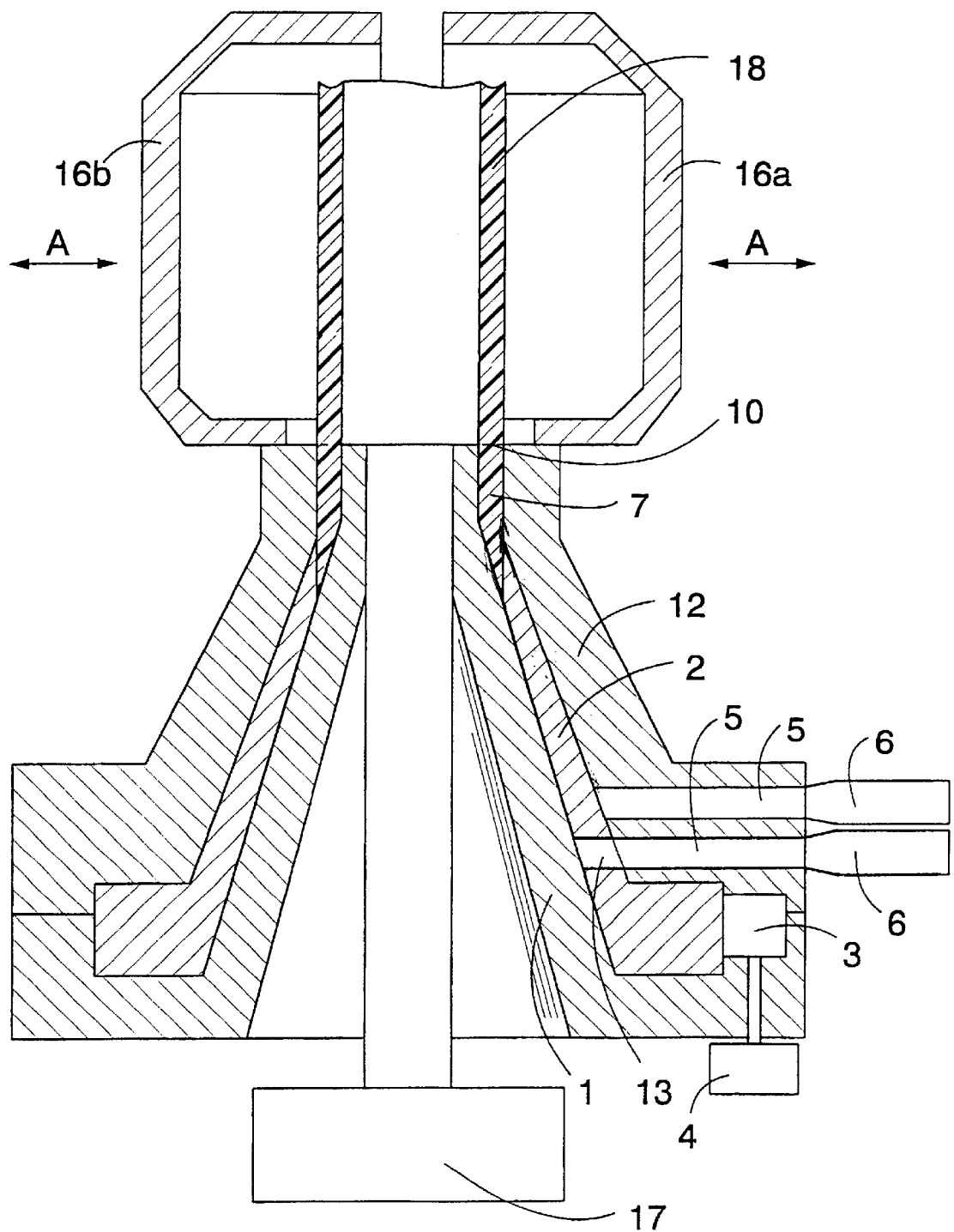
FIG. 4 is a schematic side view of the cross-section of a fourth apparatus according to the invention.

FIG. 4 shows a fourth apparatus according to the invention. The reference numerals in FIG. 4 correspond to those in FIGS. 1 to 3. At least the outer surface of the inner stator 1 is cylindrical after the end of the rotor 2. At a corresponding point, at least the inner surface of the outer stator 12 is cylindrical. The injection space 7 is thus formed in the space that is situated between the outer stator 12 and the inner stator 1 and that begins from the end of the rotor 2 and ends in the nozzle 10 at the end of the outer stator 12 and the inner stator 1. When the rotor 2 rotates it carries the plastic material to be molded into the injection space 7. The rotor provides the radial orientation of the fibres in the plastic material, the orientation remaining in the material when it is transported into the substantially tubular injection space 7. When more material is supplied with the rotor 2, the new material ejects the old material from the nozzle 10. The exterior of the nozzle 10 comprises mold parts 16a and 16b, which can be moved in the manner shown by arrows A to encircle the plastic 18 to be molded and away from it. When a sufficient amount of the plastic 18 to be molded has been extracted from the nozzle 10, the mold halves 16a and 16b are directed close to the plastic 18 to be molded. Air is thereafter blown to the interior of the plastic 18 to be molded with blow means 17 at a high positive pressure, so that this positive pressure causes the plastic 18 to be molded to compress against the edges of the mold formed by the mold halves 16a and 16b, whereupon the object will receive its final shape. The orientation of fibers in the plastic 18 to be molded also remains substantially unchanged. The blow means 17 are arranged to blow the air from between the stators 1 and 12 and the rotor 2.

Figure 5:
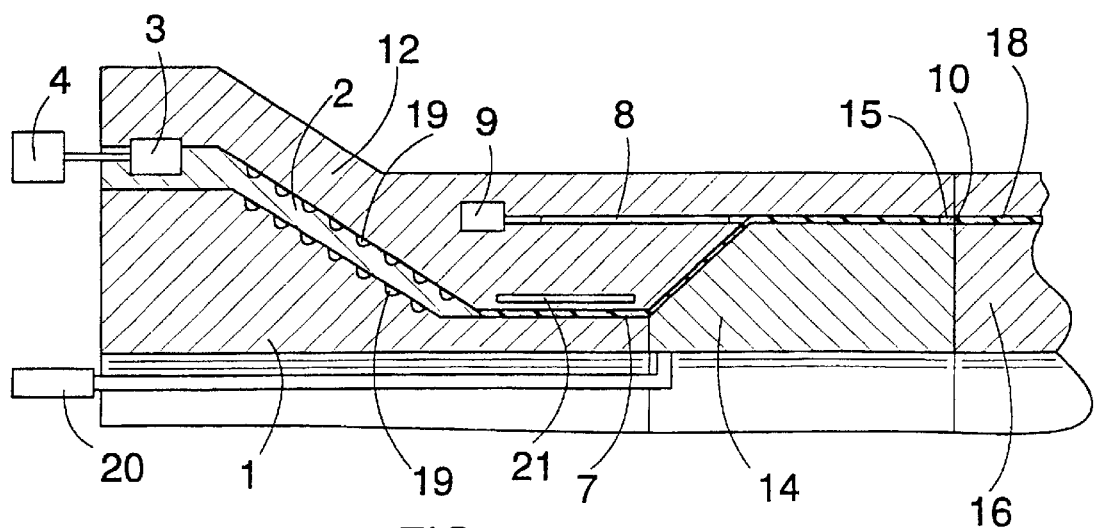
FIG. 5 is a schematic side view of the cross-section of a fifth apparatus according to the invention.

FIG. 5 shows a fifth apparatus according to the invention. The reference numerals in FIG. 5 correspond to those in FIGS. 1 to 4. For the sake of clarity, the supply conduits and the feeders are not shown. A mandrel 14 is provided as an extension to the inner stator 1. In such a case, a substantially tubular injection space 7 is formed between the mandrel 14 and the outer stator 12. The mandrel 14 is provided with an extension cone and the outer stator 12 is provided with a similar shape in the corresponding place, so that the diameter of the injection space 7 increases at the extension cone. The material to be molded is thus provided with axial orientation as it flows in the injection space at the orientation cone. The material to be molded is pressed into the mold 16 with a substantially tubular piston 8 in the same manner as shown in FIG. 3, to obtain oriented molded plastic products. The mandrel 14 can be rotated, if desired, with rotation means 20 in order to provide radial orientation. If there is no need to rotate the mandrel 14, it can be formed into a stationary construction together with the inner stator 1.

FIG. 5 shows grooves 19 provided on the outer surfaces of the inner stator 1 and the rotor 2. The rotor and stator surfaces positioned one against the other are preferably provided on one side with a screw thread and on the other side with a countergroove that is opposite in direction to the screw thread and that has a smaller width than the groove of the screw thread and a smaller gradient, so that the countergrooves are positioned closer together than the grooves of the screw thread. The rotor and stator surfaces positioned one against the other comprise especially preferably on one side a screw thread and on the other side a substantially direct groove, i.e. a groove with a gradient of 90°, so that this direct groove improves the forward supply of the material to be molded during normal use. On the other hand, if the forward flow of the material is prevented in the injection end for example by means of the piston 8, the rotor 2 can still be rotated continuously since the material to be molded can flow backwards in the apparatus along the direct grooves, and the pressure of the material cannot rise too high near the output end of the apparatus. In this manner, rapid production of for example small articles is made possible when the rotor 2 rotates at all times at a constant speed. Further, this kind of groove construction is very advantageous in a conical arrangement, since the material to be molded cannot be destroyed, because the return path of the material in the feed zone is short and it passes the grooves having the shape of the screw thread.

The apparatus of FIG. 5 is also provided with cross-linking means 21 with which the material to be molded can be first cross-linked and then pressed into the mold 16 with the piston 8. Therefore, the apparatus is particularly applicable for the manufacture of cross-linked polyethylene and injection-molded objects made of this material. The cross-linking means 21 can be placed either in the direct section of the inner stator 1 or along the extension cone. In the situation shown in FIG. 5, the material to be molded is supplied to the injection space 7 at a temperature that is lower than the cross-linking temperature of the material, and the cross-linking agent is made to react by raising the temperature of the materials by means of the cross-linking means 21. The material is thereafter pressed into the mold 16 with a substantially tubular piston 18. It is therefore possible to produce injection-molded objects with permanent orientation that has been fixed effectively by the cross-linkage. With the apparatus according to the invention, it is also possible to provide multilayer injection-molded objects, in which case different materials are supplied to different sides of the rotor 2 and both layers of material are pressed into the mold 16 simultaneously. The different layers can also be provided with different degrees of orientation for example by maintaining different temperatures for the materials on different sides of the rotor 2 or by supplying polyethylene to one side of the rotor 2 and polyethylene and peroxide to the other side, so that the peroxide cross-links the other side which therefore remains oriented, and the other side is substantially non-oriented. Such a piece can be used for example as a connecting sleeve one surface of which is welded onto the surface of the object to be joined.

The drawings and the related description are only intended to illustrate the inventive idea. The details of the invention may vary within the scope of the claims. Therefore, the surfaces of the outer stator 12 and the inner stator 1, excluding the surfaces situated against the rotor 2, may have either a conical, cylindrical or some other shape, depending on the needs of manufacturing technology, for example, or some other requirements. Further, there may be more than one rotor and more than two stators, whereupon it is possible to supply material to the injection space in several layers, thus providing multilayer products.

What is claimed is:

1. An apparatus for molding plastic comprising:
   (a) an injection space;
   (b) supplying means for supplying plastic material to the injection space, said supplying means comprising at least an inner conical stator and an outer conical stator and at least one rotatable rotor disposed outside of the inner conical stator; and
   (c) compressing means for compressing the plastic material supplied to the injection space into a mold to form the plastic material into a shape determined by the mold.

2. An apparatus as claimed in claim 1, wherein the at least one rotor and the inner and outer conical stators collectively comprise groove and countergroove means, including grooves in the at least one rotor with a first gradient and grooves in at least one of the stators with a second gradient, for facilitating a flow of the plastic material in a forward direction toward the injection space and for enabling flow of the plastic material in an opposite direction away from the injection space if the flow in the forward direction is prevented.

3. An apparatus according to claim 2, wherein the gradient of the grooves in the at least one stator is about 90°.

4. A method for molding comprising:
 (a) providing an apparatus according to claim 2;
 (b) feeding at least a first plastic material to the apparatus with rotation of the at least one rotor so that the first plastic is supplied to the injection space; and
 (c) compressing first plastic supplied into the injection space into the shape determined by the mold.

5. An apparatus according to claim 1, wherein the injection space is substantially tubular.

6. An apparatus according to claim 5, further comprising cross-linking means for cross-linking the plastic material, and a substantially tubular piston for pressing the material into the mold.

7. An apparatus according to claim 5, further comprising nozzle means, comprising a nozzle, for injecting the plastic material into the mold, said nozzle being annular.

8. An apparatus according to claim 7, wherein said nozzle means comprises closing means for opening and closing the nozzle.

9. An apparatus according to claim 1, wherein the inner stator has a stator portion that extends beyond an end of the at least one rotor, an outer surface of the inner stator being cylindrical in the stator portion extending beyond the end of the rotor, said outer stator having a stator portion that extends beyond the end of the rotor, at least an inner surface of the outer stator being cylindrical in the stator portion extending beyond the end of the rotor, said inner stator and outer stator encircling the injection space such that the injection space is substantially tubular in shape, said compressing means comprising blow means for supplying a positive pressure to blow air to an interior of the plastic material supplied to the injection space so as to compress the plastic material against an edge of the mold.

10. An apparatus according to claim 9, wherein the blow means are disposed in the middle of the supplying means.

11. A method for molding comprising:
 (a) providing an apparatus according to claim 9;
 (b) feeding at least a first plastic material to the apparatus with rotation of the at least one rotor so that the first plastic is supplied to the injection space; and
 (c) compressing the first plastic supplied into the injection space into the shape determined by the mold, said compressing step comprising passing air to an interior of the plastic supplied to the injection space to compress the plastic against the edge of the mold with positive pressure.

12. A method according to claim 11, wherein the air is passed to the interior of the plastic material from between the supplying means.

13. An apparatus according to claim 1, wherein the compressing means comprises a piston for compressing the plastic material into the mold, said piston being disposed in the middle of the supplying means.

14. A method for molding comprising:
 (a) providing an apparatus according to claim 1;
 (b) feeding at least a first plastic material to the apparatus with rotation of the at least one rotor so that the first plastic is supplied to the injection space; and
 (c) compressing the first plastic supplied into the injection space into the shape determined by the mold.

15. A method according to claim 14, wherein the injection space of the apparatus is substantially tubular in shape.

16. A method according to claim 15, further comprising feeding a second plastic to the apparatus simultaneously with the feeding of the first plastic, said second plastic comprising a different material than said first plastic, said first and second plastics being fed to different sides of the at least one rotor with rotation of the at least one rotor so that the first and second plastics are simultaneously supplied to the injection space and compressed into the mold whereby to form a multi-layer product.

17. A method according to claim 15, comprising cross-linking the first plastic in the injection space and compressing the cross-linked first plastic into the mold with a substantially tubular piston.

18. A method according to claim 15, wherein the compressing step comprises injecting the first plastic into the mold with an annular nozzle.

19. A method according to claim 18, comprising closing the nozzle when the first plastic is supplied to the injection space and, before the first plastic is compressed in the mold, opening the nozzle.

20. A method according to claim 14, wherein the compressing step comprises comprising the first plastic into the mold with a piston disposed in the middle of the supplying means.

21. A molded plastic product formed by:
 (a) imparting a helical orientation to at least a first plastic material by feeding the first plastic material between a conical stator and a rotating conical rotor disposed outside of the conical stator so that the rotor imparts the helical orientation to the first plastic material and the oriented first plastic material is supplied to a substantially tubular injection space, said helical orientation being maintained in the substantially tubular injection space; and
 (b) pressing the material from the injection space into a mold to form the molded plastic product while maintaining said helical orientation.

22. A molded plastic product according to claim 21, wherein the product is formed without weld lines.

23. A molded plastic product according to claim 21, comprising a plurality of layers including a first layer comprising said first plastic material having said helical orientation and a second layer with a second plastic material also having a helical orientation.

24. A mold plastic product according to claim 23, wherein the first plastic layer has a different degree of orientation than said second plastic layer.

* * * * *

UNITED STATES PATENT AND TRADEMARK OFFICE
CERTIFICATE OF CORRECTION

PATENT NO.    : 6,416,211 B1  Page 1 of 1
DATED         : July 9, 2002
INVENTOR(S)   : Kari Kirjavainen et al.

It is certified that error appears in the above-identified patent and that said Letters Patent is hereby corrected as shown below:

<u>Title page,</u>
Item [30], after "960768" insert -- Jun. 20, 1996 (WO) ... FI96/00359 -- and
-- Jun. 26, 1996 (WO) ... EP96/02801 --.

Signed and Sealed this

Twenty-ninth Day of October, 2002

*Attest:*

*Attesting Officer*

JAMES E. ROGAN
*Director of the United States Patent and Trademark Office*